United States Patent
Singh et al.

(10) Patent No.: US 7,375,996 B2
(45) Date of Patent: May 20, 2008

(54) REDUCED RATING T-CONNECTED AUTOTRANSFORMER FOR CONVERTING THREE PHASE AC VOLTAGES TO NINE/SIX PHASE SHIFTED AC VOLTAGES

(75) Inventors: Bhim Singh, New Delhi (IN); Gurumoorty Bhuvaneswari, New Delhi (IN); Vipin Garg, New Delhi (IN)

(73) Assignee: Indian Institute of Technology, Delhi-Department of Electrical Engineering, New Delhi (IN)

( * ) Notice: Subject to any disclaimer, the term of this patent is extended or adjusted under 35 U.S.C. 154(b) by 0 days.

(21) Appl. No.: 11/530,321

(22) Filed: Sep. 8, 2006

(65) Prior Publication Data

US 2007/0103125 A1    May 10, 2007

(30) Foreign Application Priority Data

Sep. 9, 2005    (IN)    .................. 2427/DEL/2005

(51) Int. Cl.
*H02M 5/00* (2006.01)
(52) U.S. Cl. .................................. 363/149
(58) Field of Classification Search ............ 363/5, 363/148, 149, 152, 153, 154, 155, 156
See application file for complete search history.

(56) References Cited

U.S. PATENT DOCUMENTS

| | | | | |
|---|---|---|---|---|
| 5,343,080 A | * | 8/1994 | Kammeter | .................. 307/105 |
| 5,619,407 A | * | 4/1997 | Hammond | .................. 363/155 |
| 6,198,647 B1 | * | 3/2001 | Zhou et al. | ................. 363/154 |
| 6,249,443 B1 | * | 6/2001 | Zhou et al. | .................... 363/5 |
| 6,335,872 B1 | * | 1/2002 | Zhou et al. | .................. 363/154 |

* cited by examiner

*Primary Examiner*—Adolf Berthane
(74) *Attorney, Agent, or Firm*—Caesar, Rivise, Bernstein, Cohen & Pokotilow, Ltd.

(57) ABSTRACT

The invention provides a T-connected autotransformer for converting three-phase ac input voltages to nine phase shifted ac voltages feeding three sets of three-phase diode rectifier bridges. The nine phase shifted voltages are at an angle of +20 degree or −20 degree with respect to the supply voltages and their magnitudes are essentially identical. The present design requires substantially fewer coils than other autotransformers for 18-pulse AC-DC converters, resulting in saving in space, volume, weight, size and cost of the converter. The magnetics requirement is only about 30% of the drive rating. The output voltage ratio can also be selected to give an average dc output from the proposed converter same as that of a conventional three-phase diode bridge rectifier. However, it is also possible to step up or step down the output voltage as required.

17 Claims, 7 Drawing Sheets

REDUCED RATING T-CONNECTED AUTOTRANSFORMER FOR CONVERTING THREE PHASE AC VOLTAGES TO NINE/SIX PHASE SHIFTED AC VOLTAGES

FIELD OF THE INVENTION

The present invention relates to an autotransformer for converting three phase ac voltages to nine/six phase shifted voltages, which can be used for harmonic reduction in different applications such as adjustable speed AC or DC motor drives.

BACKGROUND OF THE INVENTION

With the revolution in semiconductor self-commutating devices and reduction in their cost, most of the electric utilities in industrial, commercial, residential, aerospace environments make use of some kind of power processors. These power processors are being used in applications such as Heating, Ventilation and Air Conditioning (HVAC) systems, pumps, blowers, fans, paper and textile mills, rolling mills and the like. These power processors generally use non-linear devices such as diode, thyristor, IGBT etc., which results in injection of current harmonics, resulting in equipment overheating, low rectifier efficiency, malfunction of sensitive electronic equipments and the like. These harmonic currents result in voltage distortion (as they travel through finite source impedance) at Point of Common Coupling (PCC), thereby affecting the nearby consumers. To limit these harmonics, an IEEE Standard entitled "IEEE Guide for harmonic control and reactive compensation of Static Power Converters, IEEE Standard 519-1992" was reissued in 1992.

Different techniques based on multipulse converters have been proposed to shape ac input current waveforms in phase with input voltage. The conventional wye-delta transformer based 12-pulse rectification scheme is one such example. But it is very difficult to build wye and delta connected windings with comparable electrical characteristics (voltage and impedance). Moreover, the kVA rating of the transformer is higher than the active power drawn by the converter. To reduce the transformer rating, autotransformer based multipulse converters are used. In the autotransformer, the windings are interconnected such that the kVA rating of the magnetic coupling is only a fraction of the total kVA of the drive, resulting in reduction in size and weight of the transformer.

For applications where the demand for harmonic current reduction is more stringent, the 18-pulse AC-DC converter is generally preferred. These converters are more economical than the 24-pulse AC-DC converter, while being more effective than the 12-pulse AC-DC converter. Autotransformer based 18-pulse AC-DC converter has been described in U.S. Pat. No. 4,876,634 entitled "Multipulse converter system" to reduce the Total Harmonic Distortion (THD) of ac mains current. This results in higher dc-link voltage by about 14%, making the scheme non applicable for retrofit applications. To overcome the problem of higher dc link voltage, different configurations of 18-pulse ac-dc converters have been reported in U.S. patents such as U.S. Pat. Nos. 5,619,407, 601,113 etc. These configurations use autotransformers having three coils having a plurality of serial windings and a plurality of stub windings. The stub windings are magnetically coupled with the serial windings from the same coil. The serial windings may form either a delta or a wye connection. Further, in these configurations, the voltages from stub windings are staggered at 40 degrees with respect to the supply voltages. These solutions result in a higher size winding and core material.

Thus, it would be advantageous to have an autotransformer for converting three-phase AC voltages to nine phase-shifted voltages with less number of windings resulting in reduced magnetics rating, simple design of the transformer and which is also suitable for retrofit applications and further which may perform satisfactorily even under load variation on the dc side.

OBJECT AND SUMMARY OF THE INVENTION

The present invention includes an autotransformer for transforming three-phase AC voltages into three sets of three-phase voltages, where the transformer includes only two coils, each coil forming a plurality of serial windings and a plurality of stub windings and the two coils are connected in T-shape. Different windings are sized and configured such that the voltage magnitude at the output nodes is identical. However, the voltage magnitude at the output nodes can be stepped up or stepped down as per the requirements. Further, the adjacent nodes of one phase are at +20 degree or −20 degree with respect to its phase voltage. Moreover, the three sets of three-phase voltages so produced are 120 degree phase shifted with respect to each other.

Thus, one object of the invention is to provide an autotransformer that results in reduction in number of coils on the transformer.

Another object of the invention is to achieve the reduction in rating of magnetics, resulting in saving in cost.

One other object of the invention is to provide a single transformer that can be used either as a step up transformer or step-down transformer or a unity gain transformer. This feature enables a manufacturer to provide a single transformer that can be used in different applications, only by choosing different taps. This results in reduction in design and manufacturing cost as only a single autotransformer has to be designed and manufactured instead of two different autotransformers.

Yet, another objective is to provide a transformer which performs well even during load variation on the dc side.

To achieve the aforesaid objectives the instant invention provides an autotransformer for converting three-phase ac input voltages to nine phase shifted ac voltages comprising:
  a first serial winding connected between two phases;
  a second serial winding connected between a third phase and a center point of said first serial winding;
  a neutral point on the second serial winding;
  a plurality of stub windings connected at predefined taps of said first and second serial windings and being magnetically coupled to corresponding serial winding;
  a plurality of nodes being provided on said serial and stub windings such that the voltage magnitude at each of the nodes is measured by a vector between the neutral point and the corresponding node, said serial and corresponding stub winding being sized and arranged to obtain a predetermined a phase shift;

thereby the nine phase shifted output voltages being derived from the outputs of selected stub windings connected to said first and second serial windings and the end points of said serial windings.

The said first and second serial windings are connected in the form of T.

The voltage magnitude of the outputs of selected stub windings is equal to the voltage magnitude of corresponding phase voltage.

The said predetermined phase shift between said node and its corresponding phase is ±20 degrees.

The terminals of said first and second serial windings are connected directly to the AC source.

The voltage magnitude at each of the node is stepped up or stepped down by changing the size of said serial and stub windings.

The said nine phase outputs are connected to nine inputs of three sets of three phase diode bridge rectifiers for converting said nine phase shifted ac voltages to dc voltage.

In another embodiment of the invention, for retrofit applications said autotransformer further comprises of:

two additional stubs connected at predefined taps on said first serial winding for tapping two output phase voltages; and a predefined tap on second serial winding for tapping third phase output voltage.

The two inputs of three phase ac source are connected at the output of the two additional stubs provided on first serial winding and the third input of ac source is connected at the additional tap provided on second serial winding.

The said nine phase shifted output voltages are connected to nine inputs of three sets of three phase diode bridge rectifiers for converting said nine phase shifted ac voltages to dc voltage.

The autotransformer to step up the magnitude of nine output voltages further comprises:

an additional tap being provided on said second serial winding;

two additional stubs being connected on said first serial winding such that the one input of three-phase source is connected at the additional stub on said second serial winding and the other two inputs of three-phase source are connected at the two additional stubs provided on said first serial winding to cause an increase in the magnitude of nine output voltages resulting in higher dc link voltage.

The autotransformer to step down the magnitude of nine output voltages further comprises:

an additional tap being provided on said second serial winding;

two additional stubs being connected on said first serial winding such that the one input of three-phase source is connected at the additional stub on said second serial winding and the other two inputs of three-phase source are connected at the two additional stubs provided on said first serial winding to cause a decrease in the magnitude of nine output voltages resulting in smaller dc link voltage.

The invention also provides an autotransformer for converting three-phase ac input voltages to six phase shifted ac voltages comprising:

a first serial winding connected between two phases;

a second serial winding connected between a third phase and a center point of said first serial winding;

a neutral point on the second serial winding;

a plurality of stub windings connected at predefined taps of said first and second serial windings and being magnetically coupled to corresponding serial winding;

a plurality of nodes being provided on said serial and stub windings such that the voltage magnitude at each of the nodes is measured by a vector between the neutral point and the corresponding node, said serial and corresponding stub winding being sized and arranged to obtain a predetermined a phase shift;

thereby the six phase shifted output voltages being derived from the outputs of selected stub windings connected to said first and second serial windings.

The said predetermined phase shift between said node and its corresponding phase is ±15 degrees.

BRIEF DESCRIPTION OF THE ACCOMPANYING DRAWINGS

In order that the invention may be readily understood and put into practical effect, reference will now be made to exemplary embodiments as illustrated with reference to the accompanying figures, where like reference numerals refer to identical or functionally similar elements throughout the separate views. The figures together with a detailed description below, are incorporated in and form part of the specification, and serve to further illustrate the embodiments and explain various principles and advantages, in accordance with the present invention where:

Figure 4:
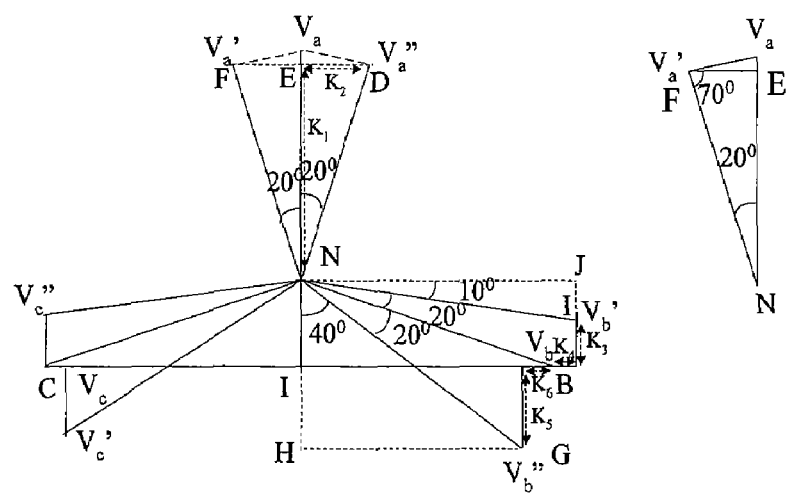

FIG. 4 is an illustration of a vector diagram of phasor voltages for proposed 18-pulse AC-DC converter along with auxiliary triangle. This diagram can be used to design the autotransformer for specific applications. It enables one to calculate the number of turns in different windings.

Figure 5:
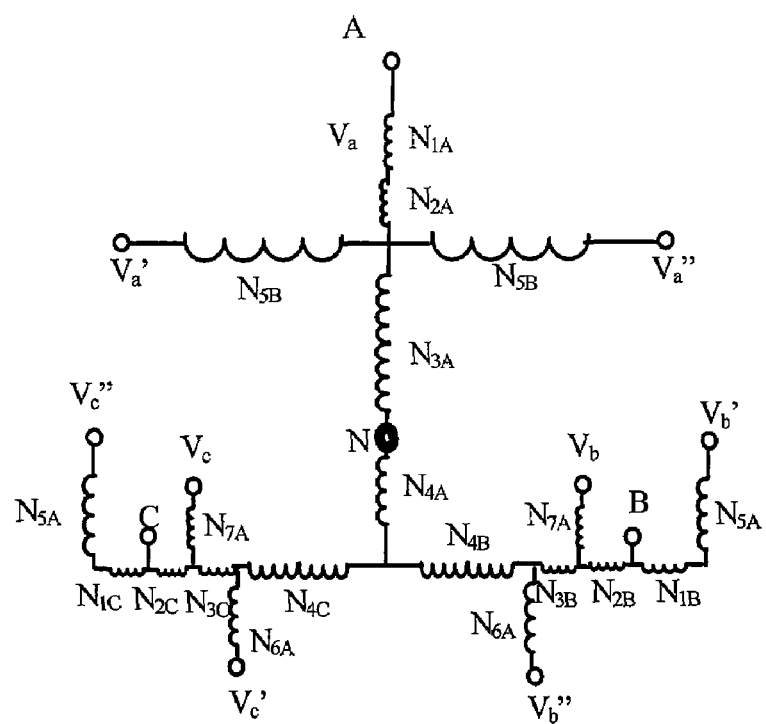

FIG. 5 is an illustration of proposed T-connected autotransformer winding diagram for retrofit applications. This diagram may be used to design the transformer for unity gain, step up or step down operation.

Figure 6:
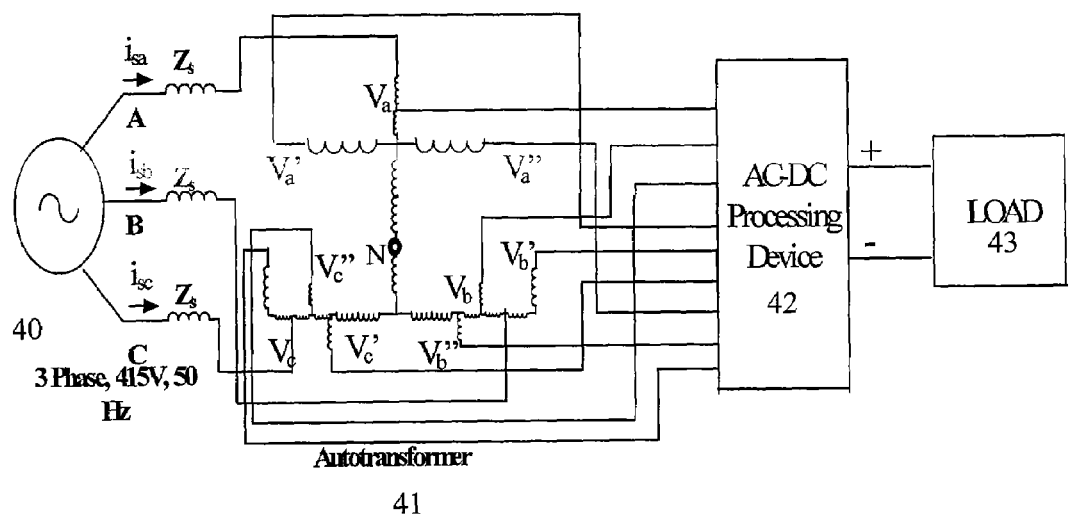

FIG. 6 is an illustration of T-connected autotransformer based proposed 18-pulse converter for retrofit applications.

Figure 7:
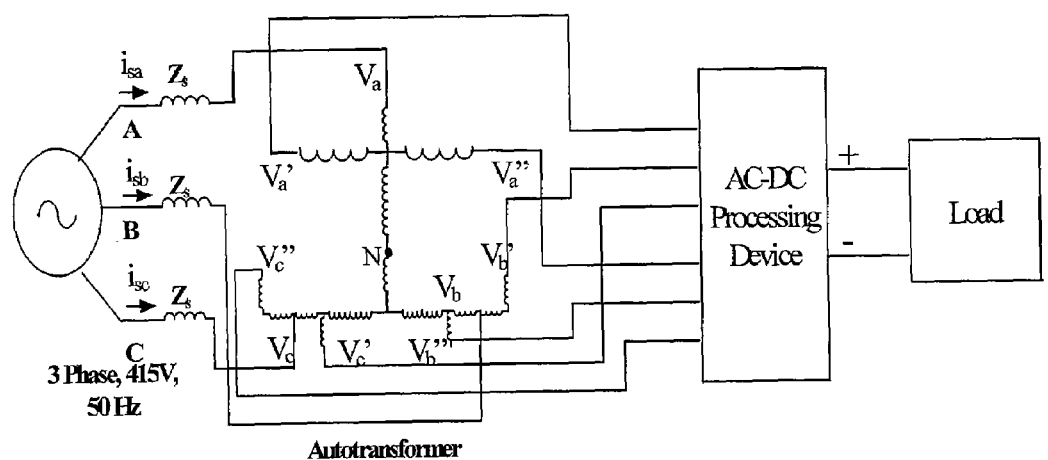

FIG. 7 shows another embodiment of the present invention to design a T-connected autotransformer based 12-pulse converter, which may be used in applications, where harmonic reduction is not so stringent.

Figure 8:
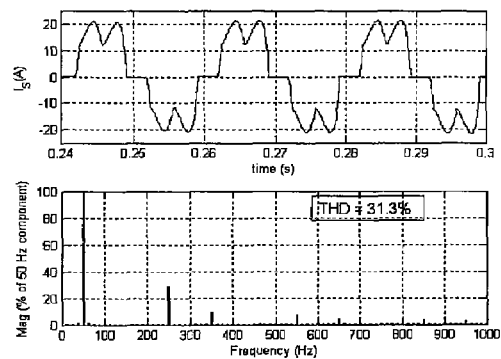

FIG. 8 is an illustration of AC mains current waveform of 7.5 kW Vector Controlled Induction Motor Drive (VCIMD) fed by 6-pulse diode bridge rectifier along with its harmonic spectrum at full load.

Figure 9:
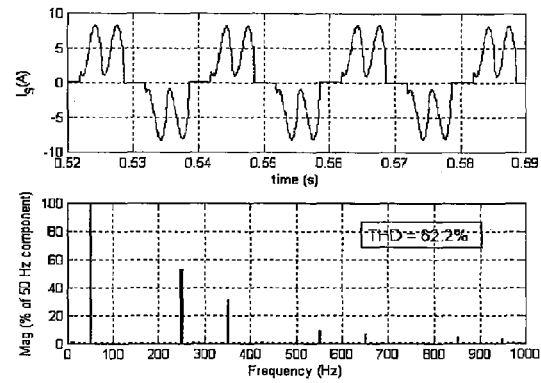

FIG. 9 is an illustration of an AC mains current waveform of VCIMD fed by 6-pulse diode rectifier along with its harmonic spectrum at light load (20%).

Figure 10:
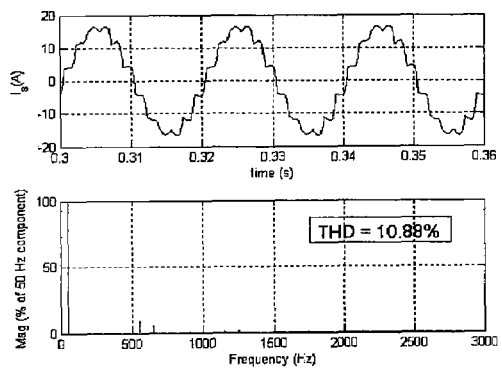

FIG. 10 is an illustration of an AC mains current waveform of VCIMD fed by 12-pulse AC-DC converter along with its harmonic spectrum at full load.

Figure 11:
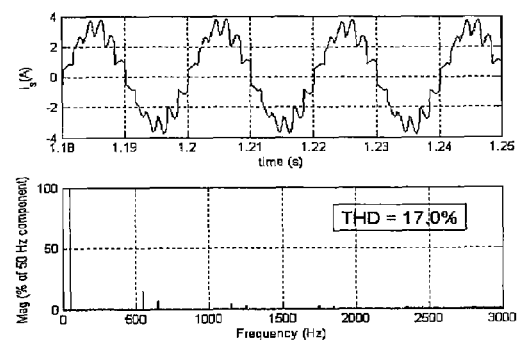

FIG. 11 is an illustration of an AC mains current waveform of VCIMD fed by 12-pulse AC-DC converter along with its harmonic spectrum at light load (20%).

Figure 12:
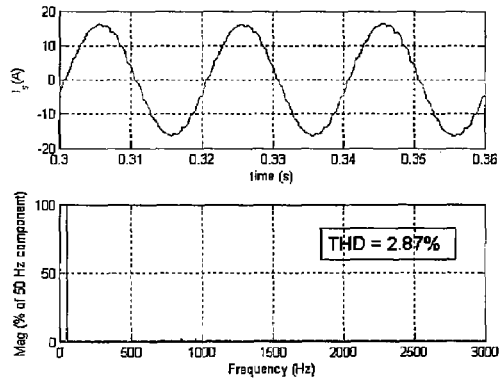

FIG. 12 is an illustration of an AC mains current waveform of VCIMD fed by 18-pulse AC-DC converter along with its harmonic spectrum at full load.

Figure 13:
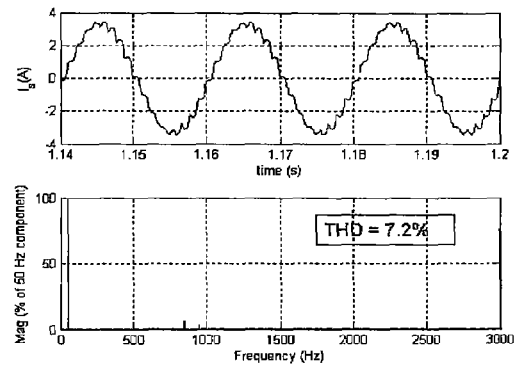

FIG. 13 is an illustration of an AC mains current waveform of VCIMD fed by 18-pulse AC-DC converter along with its harmonic spectrum at light load (20%).

Figure 14:
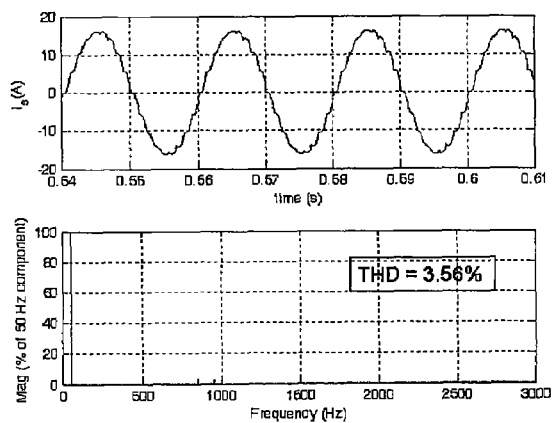

FIG. 14 is an illustration of an AC mains current waveform of VCIMD fed by proposed 18-pulse AC-DC converter along with its harmonic spectrum at full load.

Figure 15:
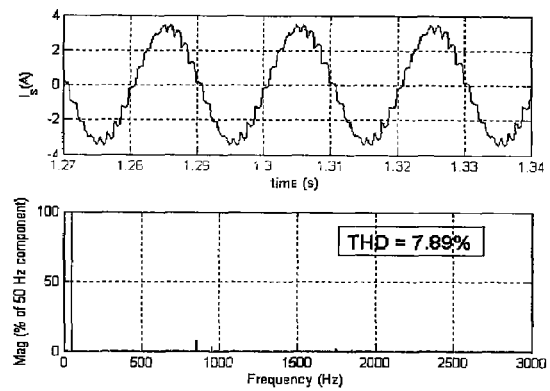

FIG. 15 is an illustration of an AC mains current waveform of VCIMD fed by proposed 18-pulse AC-DC converter along with its harmonic spectrum at light load (20%).

Figure 16:
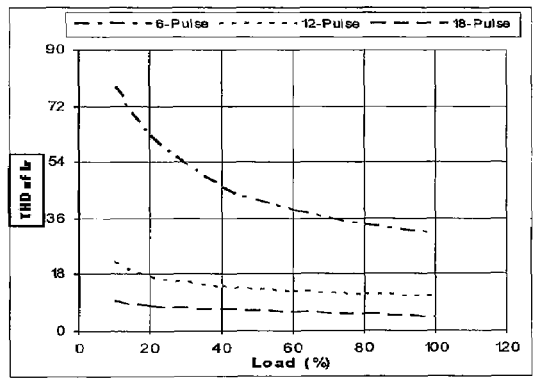

FIG. 16 is an illustration of a variation of THD of ac mains current with load on VCIMD in 6-pulse, 12-pulse and proposed 18-pulse AC-DC converter fed VCIMD.

Figure 17:
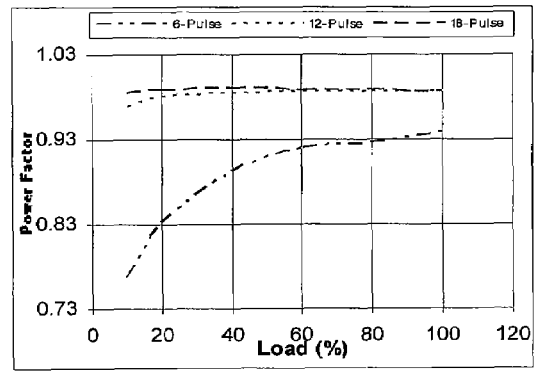

FIG. 17 is an illustration of a variation of THD of power factor with load on VCIMD in 6-pulse, 12-pulse and proposed 18-pulse AC-DC converter fed VCIMD.

DETAILED DESCRIPTION OF THE INVENTION

In relation to the drawings, exemplary embodiments of the present invention are described in the following detailed description. However, it will be apparent to a person skilled in the art that numerous other equivalent embodiments or ways of practicing the present invention exist.

The design procedure used in the invention will be explained for T-connected autotransformer based 18-pulse AC-DC converter and 12-pulse AC-DC converter. It will be appreciated by a person skilled in the art that the scope of the invention is not limited to 18-pulse AC-DC converter or 12-pulse AC-DC converter.

Conventionally, the 18-pulse AC-DC conversion may be achieved by having three sets of balanced 3-phase line voltages, which are either ±20° or ±40° out of phase with respect to each other, and the magnitude of these line voltages should be equal to each other. The minimum phase shift required for proper harmonic elimination is computed by: Phase shift=60°/Number of six-pulse converters However, to achieve reduction in rating of magnetics, this invention makes use of autotransformer based ±20° phase shifted voltages.

The proposed T-connected autotransformer makes use of only two single-phase transformers, resulting in saving in space, volume, weight and finally the cost of the drive.

Figure 1:
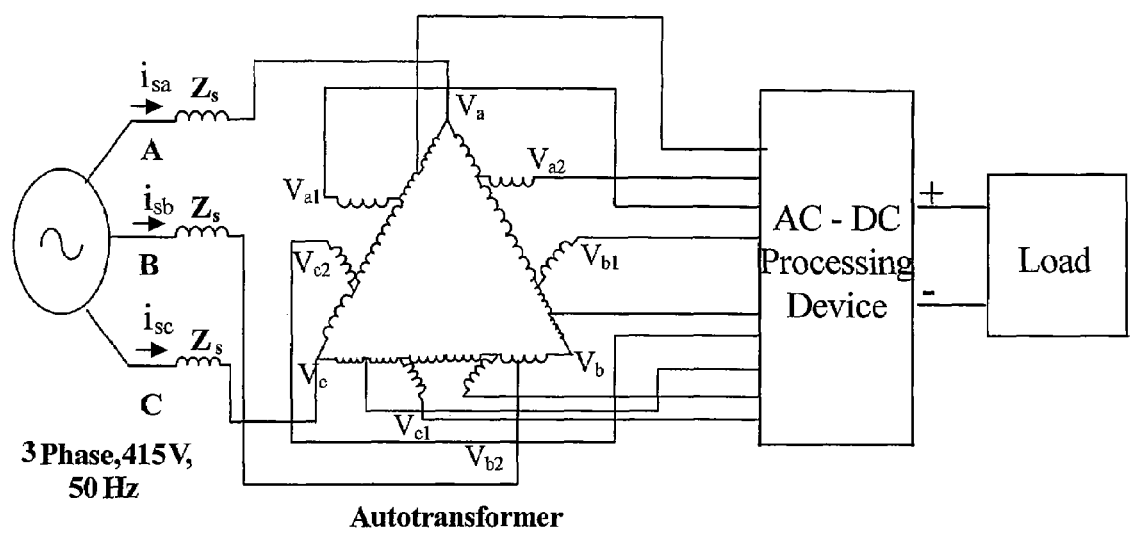
FIG. 1 shows the prior art, which shows a transformer with more windings leading to complexity in design and a higher magnetics rating, as the output voltages are phase shifted through 40 degree with respect to the supply voltage.
Figure 2:
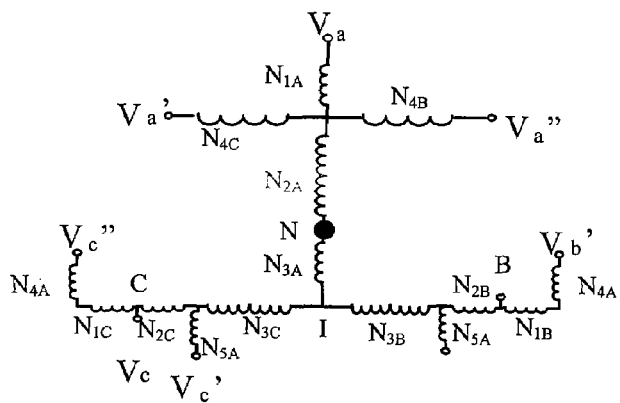
FIG. 2 shows the preferred embodiment of the autotransformer winding connections, showing the connections between different serial and stub windings.

FIG. 2 gives a schematic representation of the winding diagram of the autotransformer used in this invention. For example, coils associated with Phase 'A' are labeled $N_{1A}$, $N_{2A}$, $N_{3A}$ etc. Similarly, for phase 'B' and 'C', they are $N_{1B}$, $N_{2B}$ and $N_{1C}$, $N_{2C}$ respectively. The number of turns in different coils can be calculated as per the requirements. The junction of coils $N_{3A}$, $N_{3B}$ and $N_{3C}$ meet at point I, the center point of first serial winding. Similarly, the junction of coils $N_{2A}$ and $N_{3A}$ form the neutral point N of the autotransformer. All the input and output node voltages are measured with respect to the neutral point 'N'. It is feasible to construct the transformer using two single-phase transformers. The choice depends upon the system requirements and constraints.

The ratio of number of turns in two serial windings ($N_1$) and ($N_2$) is given by:

$$N_1/N_2 = 0.866$$

Where $N_1 = N_{1A} + N_{2A} + N_{3A}$ and $N_2 = N_{1B} + N_{2B} + N_{3B} + N_{1C} + N_{2C} + N_{3C}$ Each winding $N_{1A} \ldots N_{5A}, N_{1B} \ldots N_{5B}, N_{1C} \ldots N_{5C}$ may be constructed using a single winding specific wire. The gauge of wire in each winding varies as per its current rating. Thus each coil should be wound with a specific gauge wire. In one phase, all windings are wound such that their polarities are in the same direction, so that inductance along the windings, adds up along the magnetic path. Thus, if the right end of winding $N_{1A}$ is a start, the right end of winding $N_{2A}$ is also a start end and the right end of winding $N_{3A}$ is also a start end and so on.

It is observed that certain pre calculated number of turns in different windings help in obtaining nearly equal magnitude and 20 degree phase shifted voltages. Some practical examples giving the preferable number of turns in different windings are shown in Table-I. Small magnitude and phase angle deviations from the ideal ones are also mentioned in the Table. However, these deviations do not detract from the practical usefulness of the given design and it will be apparent to those of ordinary skill in the art that other turns selections are also possible.

TABLE I

Possible Turns for Different Windings of Autotransformer for Nominal Voltage

| $N_{1A}$ | $N_{2A}$ | $N_{3A}$ | $N_{4A}$ | $N_{5A}$ | $N_{1B}$ | $N_{2B}$ | $N_{3B}$ | $N_{4B}$ | Magnitude Deviation from Ideal | Phase Angle Deviation from 20° |
|---|---|---|---|---|---|---|---|---|---|---|
| 14 | 218 | 116 | 76 | 62 | 26 | 52 | 148 | 78 | 0.17 | 0.25° |
| 10 | 155 | 83 | 54 | 44 | 19 | 37 | 106 | 56 | 0.14 | 0.18° |
| 7 | 109 | 58 | 38 | 31 | 13 | 26 | 74 | 39 | 0.23 | 0.29° |

Figure 3:
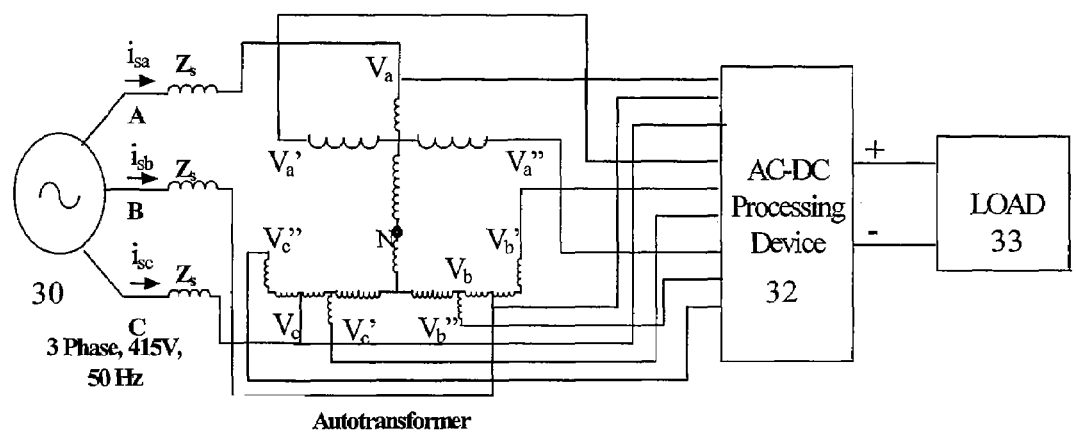
FIG. 3 is an illustration of a T connected autotransformer based 18-pulse converter (with phase shift of +20° and −20°) in accordance with the invention.

A three phase AC source 30, with equal voltage magnitude and phase shifted through 120 degree, is connected to terminals A, B and C of the proposed autotransformer in the invention. The complete schematic diagram is shown in FIG. 3. Moreover, the nine output phase shifted voltages are fed to the AC-DC power processing device 32, having three sets of three-phase diode bridge rectifiers along with a small rating inter-phase transformer. Output from 32 is fed to a drive load 33 such as vector controlled induction motor drive (VCIMD). The small rating inter-phase transformers are connected to equalize the difference in instantaneous dc output voltages of the three-diode bridge rectifiers.

As illustrated, the said serial windings are connected in the shape of T-connection. Nine separate nodes are formed, six from the output of the stub windings and three from the supply points. FIG. 4 shows the phasor diagram of different phase voltages showing the relationship among different phase voltages. Voltages at all the nodes are measured with respect to the neutral point N. The windings are sized and arranged such that all the stub winding voltages are either +20 degree or −20 degree phase shifted with respect to its phase voltage, where this stub is connected. Similarly, the supply node voltage magnitudes are also identical and 120 degree shifted in phase.

The autotransformer presented in this invention may be used as step up, step down or as a unity gain transformer.

FIG. 5 shows the winding connection diagram of the autotransformer used as a step down transformer suitable for retrofit applications. It can be seen that two additional taps on first serial winding, one additional tap on second serial winding and two small stubs on first serial windings are connected. Moreover, the turn ratio of remaining stubs is recalculated for achieving the desired output voltage.

Similarly, the number of turns in different windings for reduced voltage (for retrofit applications) is given in Table-II. Again, the magnitude as well as phase angle deviations from ideal are also given for different combinations of turns ratios.

Using the present invention, the THD of supply current of T-connected autotransformer based 12-pulse AC-DC converter at full load is 10.88% as shown in FIG. 10 and at light load is 17.0%, as shown in FIG. 11. The power factor under these conditions is 0.9856 and 0.98 respectively. The rating of the overall magnetics is 28.23% of the drive rating.

Using the present invention, the THD of supply current of T-connected autotransformer based 18-pulse AC-DC converter at full load is 2.87% and the power factor is 0.98 as shown in FIG. 12. FIG. 13 illustrates the supply current waveform at light load (20%) showing the THD as 7.2%. The dc link voltage at full load is 566V and that at light load

TABLE II

Possible Turns for Different Windings of Autotransformer for Reduced (Retrofit) Voltage

| $N_{1A}$ | $N_{2A}$ | $N_{3A}$ | $N_{4A}$ | $N_{5A}$ | $N_{6A}$ | $N_{7A}$ | $N_{1B}$ | $N_{2B}$ | $N_{3B}$ | $N_{4B}$ | $N_{5B}$ | Magnitude Deviation from Ideal | Phase Angle Deviation from $20^\circ$ |
|---|---|---|---|---|---|---|---|---|---|---|---|---|---|
| 9 | 14 | 216 | 120 | 56 | 80 | 5 | 19 | 8 | 51 | 148 | 79 | 0.06 | $0.07^\circ$ |
| 5 | 8 | 130 | 72 | 33 | 48 | 3 | 11 | 5 | 31 | 89 | 47 | 0.36 | $0.35^\circ$ |
| 13 | 21 | 324 | 180 | 84 | 112 | 7 | 28 | 12 | 76 | 222 | 118 | 0.18 | $0.02^\circ$ |

FIG. 6 illustrates T-connected autotransformer 41 based proposed 18-pulse converter for retrofit applications. The novel autotransformer 41 receives an input from the input supply 40 and is connected to an AC-DC processing device 42 that is further connected to the load 43. The aforesaid architecture is useful for retrofit applications for 18-pulse rectification.

FIG. 7 shows another embodiment of the present invention to design a T-connected autotransformer based 12-pulse converter, which may be used in applications, where harmonic reduction is not so stringent.

FIG. 8 shows the supply current waveform along with its harmonic spectrum of a conventional device at full load, showing THD of AC mains current as 31.3%, which deteriorates to 62.2% at light load (20%) as shown in FIG. 9. Moreover, the power factor at full load is 0.935, which deteriorates to 0.807 as the load is reduced to 20%, as shown in Table-III. These results show that there is a need for improving the power quality at AC mains to replace the existing 6-pulse converter.

is 579V, which are higher than that of a 6-pulse diode bridge rectifier output voltage. It can be clearly seen that the present invention provides remarkable improvement in terms of THD of supply current for light and full loads with improved power factor.

To make the scheme suitable for retrofit applications, the autotransformer has been redesigned as explained above, and the results are as follows:

FIG. 14 shows the supply current waveform of the proposed 18-pulse AC-DC converter at full load along with its harmonic spectrum, which shows that the THD of ac mains current is 3.56% and the power factor obtained is 0.987. At light load condition, the THD of ac mains current is 7.89% and the power factor is 0.989, as shown in FIG. 15, as given in Table III.

Table IV shows the effect of load variation on the drive to study various power quality indices. It shows that the proposed AC-DC converter is able to perform satisfactorily under load variation on the drive with almost unity power factor in the wide operating range of the drive and THD of

TABLE III

| Sr. No. | Topology | THD $V_s$ (%) Full Load | $I_s$ (A) Full Load | $I_s$ (A) Light Load (20%) | THD of $I_s$ (%) Full Load | THD of $I_s$ (%) Light Load (20%) | DF Full Load | DF Light Load (20%) | DPF Full Load | DPF Light Load (20%) | PF Full Load | PF Light Load (20%) | DC Link Voltage (V) Average Full Load | DC Link Voltage (V) Average Light Load (20%) |
|---|---|---|---|---|---|---|---|---|---|---|---|---|---|---|
| 1. | A | 6.76 | 14.35 | 4.355 | 31.3 | 62.2 | .954 | .849 | .979 | .950 | .935 | .807 | 549 | 557 |
| 2. | B | 3.93 | 11.63 | 2.35 | 10.8 | 17.0 | .994 | .986 | .991 | .994 | .985 | .98 | 555 | 560 |
| 3. | C | 2.64 | 11.61 | 2.35 | 2.49 | 6.66 | .999 | .997 | .98 | .988 | .98 | .986 | 563 | 578 |
| 4. | D | 3.06 | 11.46 | 2.35 | 3.56 | 7.89 | .999 | .997 | .988 | .992 | .987 | .989 | 549 | 557 |

Topology A: 6-pulse converter
Topology B: 12-pulse converter
Topology C: 18-pulse converter
Topology D: 18-pulse converter for retrofit applications supply current always less than 8%. This is within the IEEE Standard limits for SCR>20. On the magnetics front, as shown in Table V, the proposed eighteen-pulse AC-DC converter needs an autotransformer of 3.32 kVA and an interphase autotransformer of 0.26 kVA, making the total magnetics required as 3.58 kVA, which is 34.3% on the input of the drive.

FIG. 16 shows the variation of THD of ac mains current of VCIMD at full load, fed from 6-pulse AC-DC converter, 12-pulse AC-DC converter and the proposed 18-pulse AC-DC converter. Similarly, FIG. 17 shows the variation of power factor at full load for a VCIMD fed from different AC-DC converters. It is evident from these figures that the proposed eighteen-pulse AC-DC converters results in superior performance in terms of various power quality indices.

TABLE IV

Variation of power quality indices of proposed 18-pulse AC-DC converter fed VCIMD under

| Load (%) | THD (%) $I_s$ | $V_t$ | CF of $I_s$ | DF | DPF | PF | RF | $V_{dc}$ (V) |
|---|---|---|---|---|---|---|---|---|
| 20 | 7.89 | 1.57 | 1.47 | .997 | .992 | .989 | 1.11 | 557 |
| 40 | 6.78 | 2.0 | 1.44 | .997 | .993 | .99 | 1.04 | 555 |
| 60 | 5.77 | 2.4 | 1.42 | .998 | .991 | .989 | 0.96 | 554 |
| 80 | 4.35 | 2.73 | 1.42 | .999 | .989 | .988 | 0.93 | 552 |
| 100 | 3.56 | 3.06 | 1.41 | .999 | .988 | .987 | 0.92 | 549 |

A set of tabulated results (Table III) giving the comparison of different power quality parameters such as total harmonic distortion (THD) and crest factor of ac mains current (CF), power factor (PF), ripple factor (RF), displacement factor (DPF) and distortion factor (DF), THD of supply voltage at PCC is presented for a VCIMD fed from an existing 6-pulse AC-DC converter and proposed 12-pulse and 18-pulse AC-DC converters.

TABLE V

Comparison of rating of magnetics in different converter fed drive

| Sr. No | Topo-logy | Transformer Rating (kVA) | Interphase Transformer rating (kVA) | Rating of magnetics % of drive rating |
|---|---|---|---|---|
| 1. | A | 0 | 0.0 | 0.0 |
| 2. | B | 2.68 | 0.267 | 28.23 |
| 3. | C, | 3.163 | 0.288 | 33.00 |
| 4. | D | 3.320 | 0.260 | 34.30 |

We claim:

1. A T-shaped connected autotransformer for converting three-phase ac input voltages to nine phase shifted ac voltages comprising:
    a first serial winding connected between two phases;
    a second serial winding connected between a third phase and a center point of said first serial winding at or about a 90° angle to said first serial winding to form the T-shaped connection of said autotransformer;
    a neutral point on the second serial winding;
    a plurality of stub windings connected at predefined taps of said first and second serial windings and being magnetically coupled to corresponding serial winding;
    a plurality of nodes being provided on said serial and stub windings such that the voltage magnitude at each of the nodes is measured by a vector between the neutral point and the corresponding node, said serial and corresponding stub winding being sized and arranged to obtain a predetermined phase shift;
    thereby the nine phase shifted output voltages being derived from the outputs of selected stub windings connected to said first and second serial windings and the end points of said serial windings.

2. The autotransformer as claimed in claim 1 wherein the voltage magnitude of the outputs of selected stub windings is equal to the voltage magnitude of corresponding phase voltage.

3. The autotransformer as claimed in claim 1 wherein said predetermined phase shift between voltages at said stub winding and its corresponding phase is ±20 degrees.

4. The autotransformer as claimed in claim 1 wherein the terminals of said first and second serial windings are connected directly to the AC source.

5. The autotransformer as claimed in claim 1 wherein the voltage magnitude at each of the nodes is stepped up or stepped down by changing the size of said serial and stub windings.

6. The autotransformer as claimed in claim 1 wherein said nine phase shifted output voltages are connected to nine inputs of three sets of three phase diode bridge rectifiers for converting said nine phase shifted ac voltages to dc voltage.

7. The autotransformer as claimed in claim 1, wherein for retrofit applications said autotransformer further comprises of:
    two additional stubs connected at predefined taps on said first serial windings for tapping two output phase voltages; and
    a predefined tap on second serial winding for tapping third phase output voltage.

8. The autotransformer as claimed in claim 7, wherein the two inputs of three phase ac source are connected at the output of the two additional stubs provided on first serial winding and the third input of ac source is connected at the additional tap provided on second serial winding.

9. The autotransformer as claimed in claim 7 wherein said nine phase shifted output voltages are connected to nine inputs of three sets of three phase diode bridge rectifiers for converting said nine phase shifted ac voltages to dc voltage.

10. The autotransformer as claimed in claim 1 wherein to step up the magnitude of nine output voltages, the autotransformer further comprises:
    an additional stub being connected on said second serial winding;
    two additional stubs being connected on said first serial winding such that the one input of three-phase source is connected at the additional stub on said second serial winding and the other two inputs of three-phase source are connected at the two additional stubs provided on said first serial winding to cause an increase in the magnitude of nine output voltages resulting in higher dc link voltage.

11. The autotransformer as claimed in claim 1 wherein to step down the magnitude of nine output voltages, the autotransformer further comprises:
    an additional stub being connected on said second serial winding;
    two additional stubs being connected on said first serial winding such that the one input of three-phase source is connected at the additional stub on said second serial winding and the other two inputs of three-phase source are connected at the two additional stubs provided on said first serial winding to cause a decrease in the magnitude of nine output voltages resulting in smaller dc link voltage.

12. A T-shaped connected autotransformer for converting three-phase ac input voltages to six phase shifted ac voltages comprising:
- a first serial winding connected between two phases;
- a second serial winding connected between a third phase and a center point of said first serial winding at or about a 90° angle to said first serial winding to form the T-shaped connection of said autotransformer;
- a neutral point on the second serial winding;
- a plurality of stub windings connected at predefined taps of said first and second serial windings and being magnetically coupled to corresponding serial winding;
- a plurality of nodes being provided on said serial and stub windings such that the voltage magnitude at each of the nodes is measured by a vector between the neutral point and the corresponding node, said serial and corresponding stub winding being sized and arranged to obtain a predetermined phase shift;
- thereby the six phase shifted output voltages being derived from the outputs of selected stub windings connected to said first and second serial windings.

13. The autotransformer as claimed in claim 12 wherein the voltage magnitude of the outputs of selected stub windings is equal to the voltage magnitude of corresponding phase voltage.

14. The autotransformer as claimed in claim 12 wherein said predetermined phase shift between voltages at said stub winding and its corresponding phase is +20 degrees.

15. The autotransformer as claimed in claim 12 wherein the terminals of said first and second serial windings are connected directly to the AC source.

16. The autotransformer as claimed in claim 12 wherein the voltage magnitude at each of the node is stepped up or stepped down by changing the size of said serial and stub windings.

17. The autotransformer as claimed in claim 12 wherein said six phase shifted output voltages are connected to six inputs of two sets of three phase diode bridge rectifiers for converting said six phase shifted ac voltages to dc voltage.

* * * * *